United States Patent Office 3,429,180
Patented Feb. 25, 1969

3,429,180
OVERSPEED MONITOR TESTING APPARATUS
Tyge Flensburg Vind, Finspang, Sweden, assignor to Stal-Laval Turbin AB, Finspang, Sweden
Filed July 3, 1967, Ser. No. 650,763
Claims priority, application Sweden, July 14, 1966,
9,622/66
U.S. Cl. 73—168                                    3 Claims
Int. Cl. G01m *19/00*

ABSTRACT OF THE DISCLOSURE

A device for the testing of overspeed monitors for hydraulically operated servomotors and particularly those which actuate stop emergency valves with which electrical generating machines, such as steam turbines, are equipped. The device is arranged to test in pairs the functioning of two or more even numbered overspeed monitors connected in series in hydraulic oil pipes leading to the servomotors for the emergency stop valves. The device includes an arrangement of valves controlled by pressure differences; it includes a pressure-actuated signal lamp arranged to give during the testing of the functioning of a pair of the overspeed monitors, and in response to each change in the received signal, one impulse in a series of impulses causing the blocking devices for the slides in a pair of the monitors involved, to release in sequence, starting with the blocking device for the slide in the second monitor, counting in the direction of flow of the hydraulic oil, and thereafter to block the slides concerned, in the reverse sequence.

---

Certain electrical generating machines such as steam turbines, are equipped with emergency stop valves actuated by hydraulically-operated servo motors having overspeed monitors arranged in series in the hydraulic oil supply pipe to the servo motors, the said monitors draining the oil from the servo motors and thus causing the latter to close the emergency stop valves and the turbine to stop in the event of the maximum permissible speed being exceeded or electrical disturbances. With such devices it is important from the safety aspect that the functioning of the overspeed monitors be tested at regular intervals. Known devices for the testing of overspeed monitors arranged in parallel in the hydraulic oil supply pipe to the servomotors have the disadvantage that the steam turbine may unintentionally be tripped. This disadvantage is eliminated by the present invention.

Figure 1:
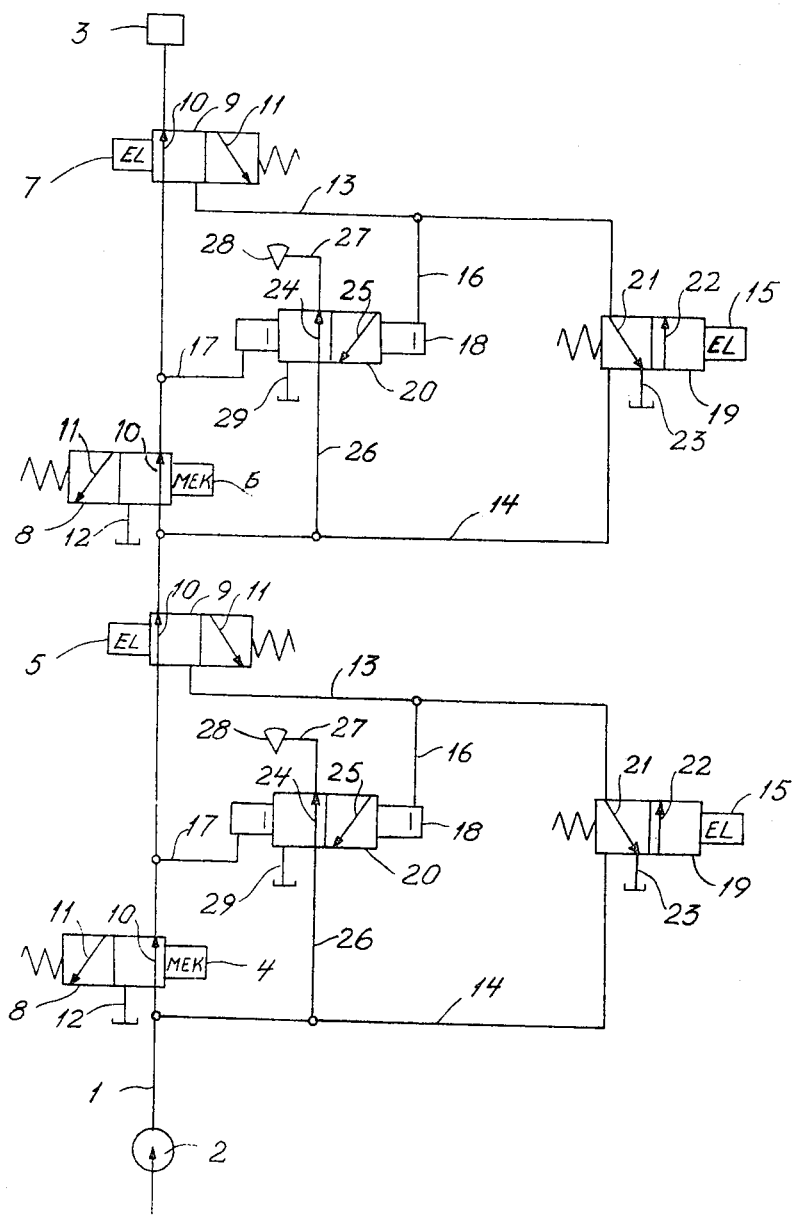
Figure 2:
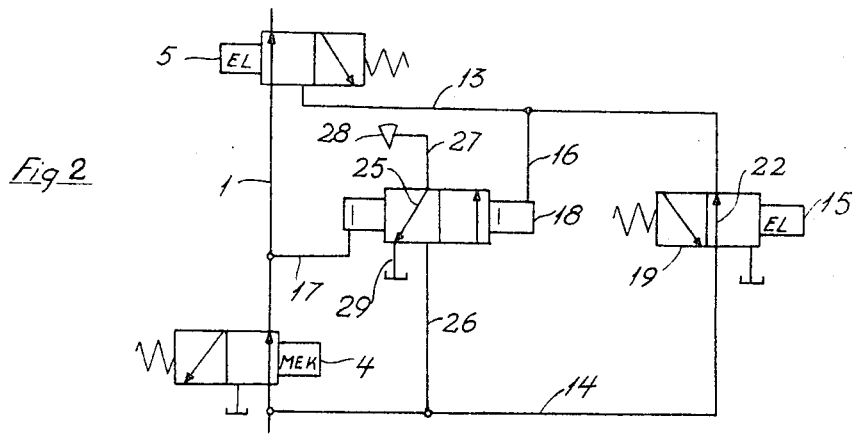
Figure 3:
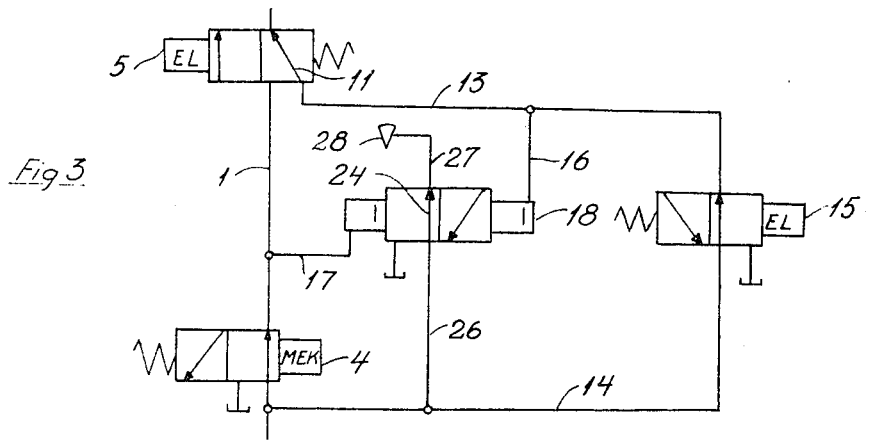
Figure 4:
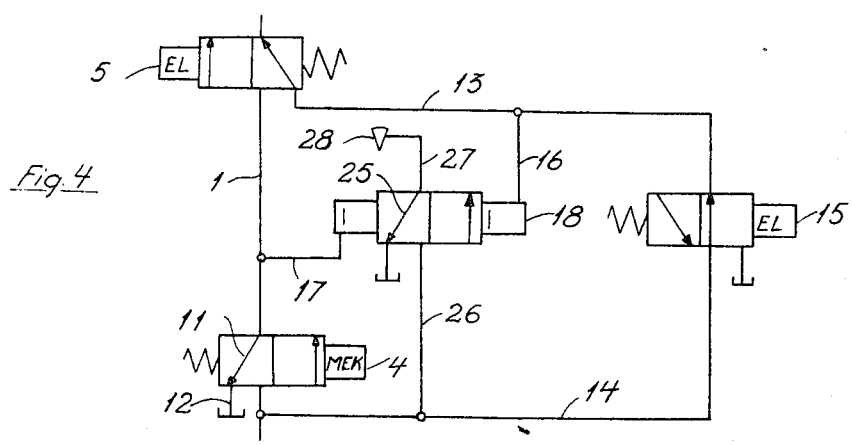

The invention is schematically illustrated in the accompanying drawings in which FIG. 1 shows a device for the testing of the functioning of each of two pairs of overspeed monitors in the positions assumed by these devices and with the overspeed monitors in operation, when no testing of the functioning is being carried out, and FIGS. 2–4 show the positions assumed by the devices and the monitors at various stages during the testing of the functioning of a pair of overspeed monitors.

In the drawings, 1 designates a hydraulic oil supply pipe fed by a hydraulic pump 2, 3 being a servo motor connected to the hydraulic pipe and which controls an emergency stop valve, not shown, for a steam turbine. Four overspeed monitors 4, 5, 6 and 7 are connected in series in the hydraulic oil pipe between the hydraulic pump and servomotor. Alternate monitors 4 and 6 consist preferably of a spring-loaded 3-way slide valve 8 having two slide positions and a mechanically actuated slide blocking device. Alternate monitors 5 and 7 consist of a 3-way spring-loaded slide valve having two slide positions and an electrically actuated slide blocking device. The slides incorporate flow ducts 10 for the supply of hydraulic oil to the servo motor and flow ducts 11 for the draining of hydraulic oil from the servo motor. Drain lines 12 are connected to an overspeed monitor as at 4 and 6 and combined drain and supply lines are connected as shown at 13 to the overspeed monitors 5 and 7. The arrangements for testing the functioning of the monitors in each pair 4 and 5, and 6 and 7, are identical so that only the device for the monitors 4 and 5 will now be described.

For the testing of the functioning of overspeed monitors 4 and 5 a by-pass valve 15 is arranged between the drain and supply line 13 from monitor 5 and a supply line 14 branching from the hydraulic supply pipe 1 prior to the monitor 4. A relay valve 18 is arranged between an oil supply pipe 16 branching from the drain and supply pipe 13 and an oil supply pipe 17 branching from the oil supply pipe 1 between the monitors 4 and 5. The by-pass valve comprises a spring-loaded 3-way slide valve 19 with two slide positions and an electrically actuated slide blocking device. The relay valve 18 comprises a 3-way slide valve 20 with two slide positions. The slide in this valve is actuated by the oil pressure in supply pipes 16 and 17.

As shown in the drawings, the slide in the by-pass valve 15 has two flow ducts 21, 22 of which in normal operation, as in FIG. 1 when there is no testing of the functioning of the overspeed monitors, and the slide is blocked, duct 21 connects drain and supply pipe 13 between the monitor and the by-pass valve with a drain line 23 connected to the by-pass valve for the draining of the oil from the servo motor when the turbine is tripped due to electrical disturbances, whereupon the blocking device for the slide in the monitor 5 (or monitor 7) is released and the slide assumes such a position that its flow duct 11 links the oil supply pipe 1 to the servo motor 3 with the drain and supply pipe 13. During testing of the functioning of the overspeed monitors 4, 5 and after manual opening of the by-pass valve 15, flow duct 22 connects the oil supply pipe 14 to the by-pass valve with the drain and supply pipe 13, for the supply of hydraulic oil to the same.

The slide in slide valve 20 of the relay valve 18 has two flow ducts 24 and 25. During both the testing of the functioning of the monitors and otherwise, when the pressure in oil supply line 17 is greater than that in the oil supply line 16 to the relay valve, duct 24 connects an oil supply pipe 26, which leads from oil supply pipe 14 and is connected to the relay valve, with an oil supply pipe 27 which is also connected to the relay valve and to which an indicating lamp 28 is connected. During the testing of the functioning of the monitors, when the pressure in oil supply pipe 16 is greater than that in oil supply pipe 17, duct 25 connects oil supply pipe 27 with a drain line 29 connected to the relay valve. Indicating lamp 28 is connected by electric impulse wires, not shown, to the blocking devices of the overspeed monitors 4 and 5 and the by-pass valve 15, in order to give impulses in sequence during the testing of the functioning, first to the blocking devices of the monitors so that they release the slides in their respective slide valves, and then to cause the blocking of these slides and the blocking of the slide in the by-pass valve 15. Through, for example, being illuminated and extinguished, the indicating lamp gives indication of each slide movement, as is apparent from the following description of the functioning of the testing device.

During running, when no testing of functioning is in progress, the flow duct 10 in the overspeed monitors 4, 5, 6 and 7, the slides of which are blocked, are in communication in series with the hydraulic oil supply pipe 1 and the hydraulic oil flows from the pump 2 to the servo motor 3. Furthermore, drain and oil supply pipe 13, between the monitor 5 and its by-pass valve and the monitor 7 and its by-pass valve, is in connection with the corresponding drain lines 23, connected to the by-pass valves, whereby pressure is relieved from the drain and supply line 13. Since in this state there is pressure in supply line 17, the slides of the two relay valves 18 assume such a position that their flow ducts 24 connect the oil supply lines 26 with the corresponding supply lines 27 and indicating lamps 28, the latter being assumed to be extinguished under these conditions.

In herein referring to the valves as "three-way valves" this is done with the understanding that while such valves can assume two positions, each of them is connected to three oil lines. Taking the valve 5 as an example, it is noted that while it has two positions, it is however open between various pipes during the transition between the two positions and is therefore believed correctly referred to as "three-way."

When the functioning of the monitors 4 and 5 is tested the blocking device of the slide in the slide valve 19 to the by-pass valve 15 is released manually, said valve 15 being actuated by electric impulses which are created by mechanically pressing an electric button which slide, as shown in FIG. 2, is thereby displaced by its spring so that its flow duct 22 connects oil supply pipe 14 with the drain and supply line 13 between the monitor 5 and the by-pass valve 15. This and oil supply pipe 16 are thereby pressurized and since this pressure is greater then that in the oil supply pipes 1 and 17 (pressure losses) the slide in the slide valve for the relay valve 18 is moved so that its flow duct 25 connects the oil supply pipe 27 to the drain line 29, connected to the relay valve. Pressure will be relieved in the oil supply pipe 27 and the indicating lamp 28 in this line will be illuminated. Thereafter the indicating lamp sends to the blocking device for the slide in monitor 5 an impulse causing it to release and assume the position shown in FIG. 3, whereupon the hydraulic oil flow from the oil supply pipe between the monitors 4 and 5 to the following monitors is interrupted and the flow duct 11 in the slide connects oil supply pipe 1 to the monitors 6 and 7 and servo motor 3 with the drain and supply pipe 13, whereupon monitors 4 and 5 are blocked and hydraulic oil flows from pump 2 through the oil supply pipe 14, by-pass valve 15, drain and supply pipe 13, monitor 5 and oil supply pipe 1 with monitors 6 and 7 to the servo motor. This results in the pressure in supply pipes 1 and 17 becoming greater than the pressure of the oil flowing to the servo motor and oil pipe 16 (pressure losses) and the slide in relay valve 18 assumes a position that the oil supply pipe 27 to the indicating lamp is pressurized, whereby the lamp is extinguished and then sends an impulse causing the blocking device for the slide in the monitor 4 to be released. The valves 4 and 6 are mechanically actuated as is disclosed in the drawings. During test of their function mechanical devices of known character and which are not shown in the drawings, are released, and these devices are connected with the signal lamps 28 from which they receive electrical impulses. The flow duct 11 in this slide will thereupon connect the oil supply pipe 1 between the monitors 4 and 5 with the drain line 12, as shown in FIG. 4, whereupon the oil will be drained from this part of the oil supply line 1. The oil pressure in drain and supply line 13 and thus in the oil supply line 16 is the dominant pressure at this stage and the slide in the relay valve 18 is displaced so that flow duct 25 drains the oil from the oil supply pipe 27, whereby the indicating lamp illuminates and thereafter sends an impulse causing the blocking device for the slide in the monitor 4 to block the slide. The functioning of the testing device is thereby reversed as compared to the operation above described and, when finally the slide in the by-pass valve 15 has been blocked, the testing cycle is complete and as long as the indicating lamp gives signals throughout the test the monitors 4 and 5 are functioning satisfactorily. The testing of the functioning of the monitors 6 and 7 is accomplished in the same way as just described.

In the event that a monitor fails to function, that is, if for any reason the slide in the slide valve involved does not assume the position as signalled by the indicating lamp, the pressure state in the oil pipes 16 and 17 to the relay valve will consequently remain unchanged and the indicating lamp will maintain the signal that it shows on this occasion and thus show that the monitor is not functioning as it should and that steps leading to its repair must be taken.

Having thus described an embodiment of the invention, it is obvious that the same is not to be restricted thereto.

What I claim is:

1. A device for use in conjunction with electrical generating machines such as steam turbines and for the testing in pairs of four or more in number of overspeed monitors which are connected in series in hydraulic oil supply pipes connected to servo motors for emergency slide valves, the improvements comprising spring-loaded three-way slide valves having two positions and a blocking device for the slides of the valves, mechanically-actuated monitors, other monitors having electrically actuated blocking devices, by-pass valves arranged to maintain the supply of oil to the servo motor during the testing of the functioning of a pair of the monitors to prevent unnecessary tripping of the steam turbine, one of said by-pass valves being introduced at each pair of monitors between a branch of the oil supply pipe before the first of the monitors in the direction of flow of the hydraulic oil, and a combined drain and supply line leading from another of the monitors, a relay valve arranged to be switched by the difference between the pressure in the oil supply pipe between each said pair of monitors and the pressure in the drain and supply pipe between the second monitor, counting in the direction of flow of the hydraulic oil, and the by-pass valve, whereby the relay valve gives, according to its setting, a high or low pressure signal to a pressure actuated indicating lamp arranged to give, during the testing of the functioning of a pair of the overspeed monitors, and in response to each change in the received signal, one impulse in a series of impulses causing the blocking devices for the slides in the pair of monitors involved to release in sequence, starting with the blocking device for the slide in the second monitor, counting in the direction of flow of the hydraulic oil, and thereafter to block the slides concerned, in the reverse sequence.

2. A device according to claim 1, wherein the by-pass valve consists of a spring-loaded 3-way slide valve having two slide positions, an electrically actuated blocking device for the slide, the said by-pass valve connecting, in one of its settings when the slide is blocked, the drain and supply line from the second monitor, counting in the direction of flow of the hydraulic oil, with a drain line connected to the by-pass valve for the draining of hydraulic oil from the servo motor in the event that the said monitor is tripped; and said by-pass valve connecting in its other setting when the slide is released, the oil supply pipe connected to the by-pass valve with the oil supply and drain line between said by-pass valve and said second monitor, for the supply of hydraulic oil to the servo motor.

3. A device according to claim 1, wherein the relay valve consists of a spring-loaded 3-way slide valve having two slide positions, which in one of its settings when the pressure in the oil supply pipe between the said pair of monitors is greater than the pressure in the drain and supply line between the by-pass valve and the second monitor in the pair, connects the oil supply pipe before the first monitor with an oil supply pipe for the supply of hydraulic oil to the indicating lamp; and in the other of its settings when the relationship between the pressures actuating the switching of the relay valve is reversed, connects the oil supply pipe to the indicating lamp with a drain line for the draining of oil from the indicating lamp.

References Cited

UNITED STATES PATENTS

| 2,450,922 | 10/1948 | Snider | 73—168 XR |
| 2,478,938 | 8/1949 | Osterhus. | |
| 3,099,163 | 7/1963 | Raymond | 73—168 |
| 3,179,291 | 4/1965 | Umbach et al. | 73—168 XR |

LOUIS R. PRINCE, *Primary Examiner.*

M. J. NOLTON, *Assistant Examiner.*